(12) United States Patent
Ciotti et al.

(10) Patent No.: US 6,910,555 B2
(45) Date of Patent: Jun. 28, 2005

(54) CALIPER BODY FOR A FIXED-CALIPER DISK BRAKE

(75) Inventors: Alessandro Ciotti, Bergamo (IT); Cristian Crippa, Bergamo (IT)

(73) Assignee: Freni Brembo S.p.A. (IT)

( * ) Notice: Subject to any disclaimer, the term of this patent is extended or adjusted under 35 U.S.C. 154(b) by 0 days.

(21) Appl. No.: 10/297,704

(22) PCT Filed: Jun. 8, 2001

(86) PCT No.: PCT/IT01/00297
§ 371 (c)(1),
(2), (4) Date: May 16, 2003

(87) PCT Pub. No.: WO01/98680
PCT Pub. Date: Dec. 27, 2001

(65) Prior Publication Data
US 2003/0178261 A1 Sep. 25, 2003

(30) Foreign Application Priority Data
Jun. 22, 2000 (EP) .......................... 00830437

(51) Int. Cl.⁷ .............................. F16D 55/00
(52) U.S. Cl. ................. 188/73.47; 188/71.3; 188/72.5; 188/73.2
(58) Field of Search ............... 188/73.47, 68, 188/70 R, 71.1, 71.3, 71.4, 72.1, 72.4, 72.5, 73.1, 73.2, 73.44, 73.45

(56) References Cited
U.S. PATENT DOCUMENTS

| | | | |
|---|---|---|---|
| 4,220,224 A | | 9/1980 | Karasudani |
| 5,564,532 A | * | 10/1996 | Baba et al. ............... 188/73.39 |
| 5,660,253 A | * | 8/1997 | Rike ....................... 188/264 G |
| 5,979,611 A | * | 11/1999 | Sasaki et al. ............. 188/73.43 |
| 6,260,670 B1 | * | 7/2001 | Maehara ................... 188/73.47 |
| 2001/0013448 A1 | * | 8/2001 | Schorn et al. ............. 188/71.1 |
| 2001/0032757 A1 | * | 10/2001 | Ballinger et al. .......... 188/71.1 |

FOREIGN PATENT DOCUMENTS

| | | | |
|---|---|---|---|
| DE | 3613346 | * | 10/1987 |
| DE | 43 24 988 A1 | | 2/1995 |
| EP | 0 826 894 A1 | | 3/1998 |
| GB | 1 242 220 | | 8/1971 |

* cited by examiner

Primary Examiner—Robert A. Siconolfi
Assistant Examiner—Devon Kramer
(74) Attorney, Agent, or Firm—Frommer Lawrence & Haug, LLP; John R. Lane

(57) ABSTRACT

A caliper body for a fixed-caliper disk brake which can be associated with a disk in a manner such that its distance from the disk is kept unchanged and which is unusually strong and capable of a silent braking action comprises a first half-body which can house first means for generating the braking force and which can be arranged facing a first braking surface of one side of the disk, and a second half-body which can house second means for generating the braking force and which can be arranged facing a second braking surface of an opposite side of the disk, the first and second half-bodies being connected, by fixing means, to bridge elements which can be arranged astride the disk; the bridge elements are portions of a single element for connecting and supporting the half-bodies.

12 Claims, 7 Drawing Sheets

CALIPER BODY FOR A FIXED-CALIPER DISK BRAKE

BACKGROUND OF THE INVENTION

The subject of the present invention is a caliper body for a fixed caliper disk brake, usable in vehicles and intended, in particular, for high-performance motor cars.

A further subject of the present invention is a disk brake unit having a caliper body of the type specified above.

It is known that a caliper body for a fixed-caliper disk brake can be associated with a disk in a manner such that its distance from the disk is kept unchanged. As is well known, the caliper body comprises a first half-body which can house first means for generating a braking force and which is arranged facing a first braking surface of an outer side of the disk, as well as a second half-body, which can house second means for generating the braking force and which is arranged facing a second braking surface of an inner side of the disk. The first and second half-bodies are connected, by fixing means, to two bridge elements arranged astride the disk.

The term "outer side" is intended to define the side of the disk brake unit which faces outwardly relative to the vehicle when it is mounted on the hub and on the stub-axle or hub-carrier of the wheel. Similarly, the term "inner side" is intended to define the side of the unit which faces inwardly relative to the vehicle when mounted on the wheel hub.

Moreover, reference will also be made below to an "axial axis" (indicated "a" in FIG. 1), a "radial axis" (indicated "r" in FIG. 1), and a "tangential axis" (indicated "t" in FIG. 1), which are intended to define a first axis parallel to the axis of rotation of the disk, a second axis perpendicular to the axis of rotation of the disk and extending through the axis of rotation, as well as a third axis parallel to the plane of rotation of the disk and perpendicular to the other two axes, respectively.

As is known, during the braking of a vehicle, the significant and large forces which affect the caliper body are a clamping force and a braking force. These forces are produced by the means for generating the braking force, for example, by at least one pair of cylinder and piston units which are housed in the half-bodies and the pistons of which act on the opposed braking surfaces of the disk by means of pads.

The force of the clamping of the pads against the braking surfaces of the disk is directed axially and is balanced by the structure of the caliper body which is disposed astride the disk. In particular, this force is opposed by the bridge elements which extend around the disk, forming closed force rings. This force stresses the caliper body, causing an opening-out of the bridge elements or, in other words, a bending of the caliper body about tangential axes.

The braking force, on the other hand, is directed tangentially and, in particular, in the direction of rotation of the disk. This force is transmitted by the disk to the pads and is opposed by shoulders in the bridge elements, so as to be discharged onto support means of the caliper body which are fixed, for example, to a stub axle or hub-carrier of a wheel of the vehicle. This force stresses the bridge elements, also deforming portions of these elements which are necessary for the connection of the half-bodies. The braking force is also discharged onto the support means, purely on the side of the caliper body which faces the inner side of the disk, also causing the caliper body to bend about radial axes.

As is well known, the above-mentioned forces are distributed non-uniformly on the caliper body and, moreover, their magnitude is variable over time so that, in addition to deformations of the caliper body which are sometimes not acceptable for correct operation of the disk brake, they also cause vibrations and undesired whistling.

SUMMARY OF THE INVENTION

The problem upon which the present invention is based is that of proposing a caliper body for a fixed-caliper disk brake which has structural and functional characteristics such as to overcome the problems mentioned above with reference to the prior art.

This problem is solved by means of a caliper body for a fixed-caliper disk brake which can be associated with a disk in a manner such that its distance from the disk is kept unchanged, the caliper body comprising a first half-body which can house first means for generating a braking force and which is arranged facing a first braking surface of one side of the disk, a second half-body which can house second means for generating the braking force and which is arranged facing a second braking surface of an opposite side of the disk, the first and second half-bodies being connected, by fixing means, to bridge elements arranged astride the disk, characterized in that the bridge elements are portions of a single element for connecting and supporting the half-bodies.

BRIEF DESCRIPTION OF THE SEVERAL VIEWS OF THE DRAWINGS

Further characteristics and the advantages of the present invention will become clear from the following description of preferred embodiments thereof, given by way of non-limiting example, with reference to the appended drawings, in which.

DETAILED DESCRIPTION OF THE PREFERRED EMBODIMENTS

Figure 1:
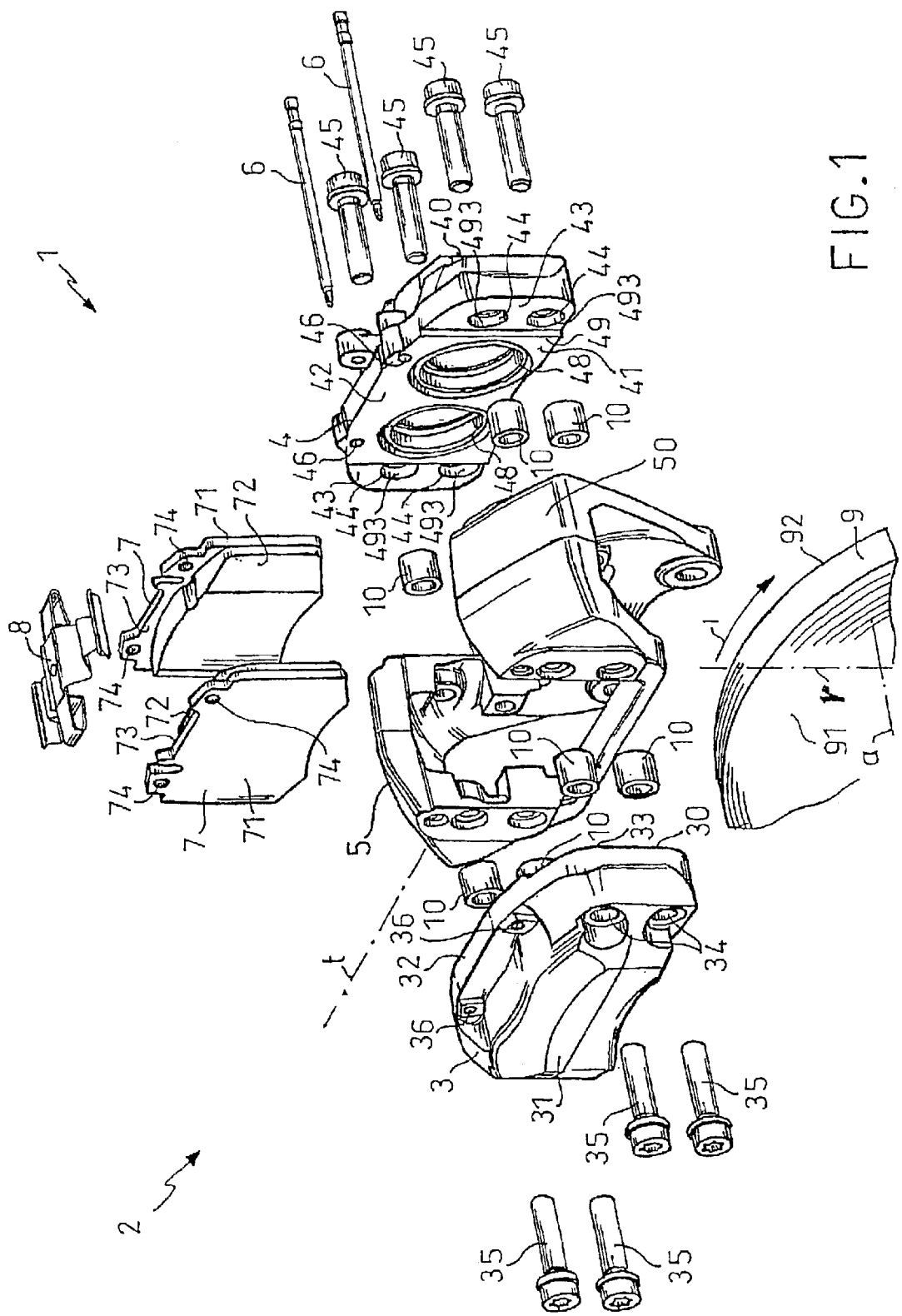
FIG. 1 is a perspective view of a fixed-caliper disk brake unit according to the invention, with parts separated.

With reference to the appended drawings, a fixed-caliper disk brake unit is generally indicated 1. The unit comprises a caliper body, generally indicated 2, which extends astride a sector of a braking disk 9. The caliper body 2 comprises a first half-body 3, a second half-body 4, and a connecting and support element or, more briefly, a connecting element 5, between the first and second half-bodies 3 and 4.

The caliper body 2 is connected to support means, of conventional type and therefore not shown in the drawings, for fixing to a vehicle in known manner.

The first and second half-bodies 3 and 4 are in the form of elongate, reflectively symmetrical shells to be positioned on opposite sides of the disk 9.

In particular, the first half-body 3 is disposed on the outer side of the disk so as to face a first braking surface 91 of the disk. The second half-body 4 is positioned facing the inner side of the disk so as to face a second braking surface 92 of the disk.

Each of the first and second half bodies 3 and 4 has an inner surface 30 or 41, facing the disk, and an opposite surface 31 or 40.

Each of the surface 30 of the first half-body 3 which faces the disk, and the surface 41 of the second half-body 4 which faces the disk has two seats 33 or 43, respectively, formed laterally relative to corresponding central portions 32 and 42 (FIG. 1 shows only one of these lateral seats 33).

Through-holes 34 and 44 are formed in each of the lateral seats 33 and 43 (FIG. 1 shows the through-holes of only one seat 33) for housing corresponding screws 35 and 45 for fixing to the connecting element 5.

In each of the central portions 32 and 42, on the other hand, two hydraulic braking cylinders 48 are formed integrally in the first and second half-bodies 3 and 4 (FIG. 1 shows only the cylinders of the second half-body 4) and are arranged so as to appear and to open in respective surfaces 30 and 41 facing the disk.

Moreover, the first and second half-bodies 3 and 4 comprise pairs of pistons guided for sliding in the hydraulic cylinders 48.

Ducts are present in the first and second half-bodies 3 and 4 in wholly conventional manner for the supply of braking fluid to the cylinders formed in the half-bodies and housing the pistons.

In each of the central portions 32 and 42, there are also two through-holes, 36 and 46 respectively, for engagement by two guide pins 6.

The guide pins 6 have the function of guiding two pads 7 each mounted between the pistons of the first and second half-bodies 3 and 4 and the braking surfaces 91, 92 of the disk.

In particular, the wholly identical and opposed pads 7 comprise respective plates 71 for supporting corresponding friction linings 72. The friction linings 72 are fixed, in conventional manner, to respective support surfaces 73 of the plates, these surfaces facing towards the braking surfaces of the disk. Moreover, each plate 71 has two through-holes 74 corresponding to the through-holes 36 and 46 formed in the first and second half-bodies 3 and 4, respectively.

The fixed-caliper disk brake unit 1 also comprises wholly conventional resilient means 8 for holding the pads 7 on the guide pins 6 and, at the same time, for keeping the pads 7 away from the disk when the unit is not in operation.

The connecting element 5 is interposed between the first and second half-bodies 3 and 4 of the caliper body 2 and comprises a first bridge portion or element 50, for example, disposed in the region in which the disk emerges from the caliper body during its rotation (in accordance with the arrow "i" of FIG. 1), and a second portion or element 51, remote from the first, for example, in the region in which the disk enters the caliper body during its rotation.

Figure 3:
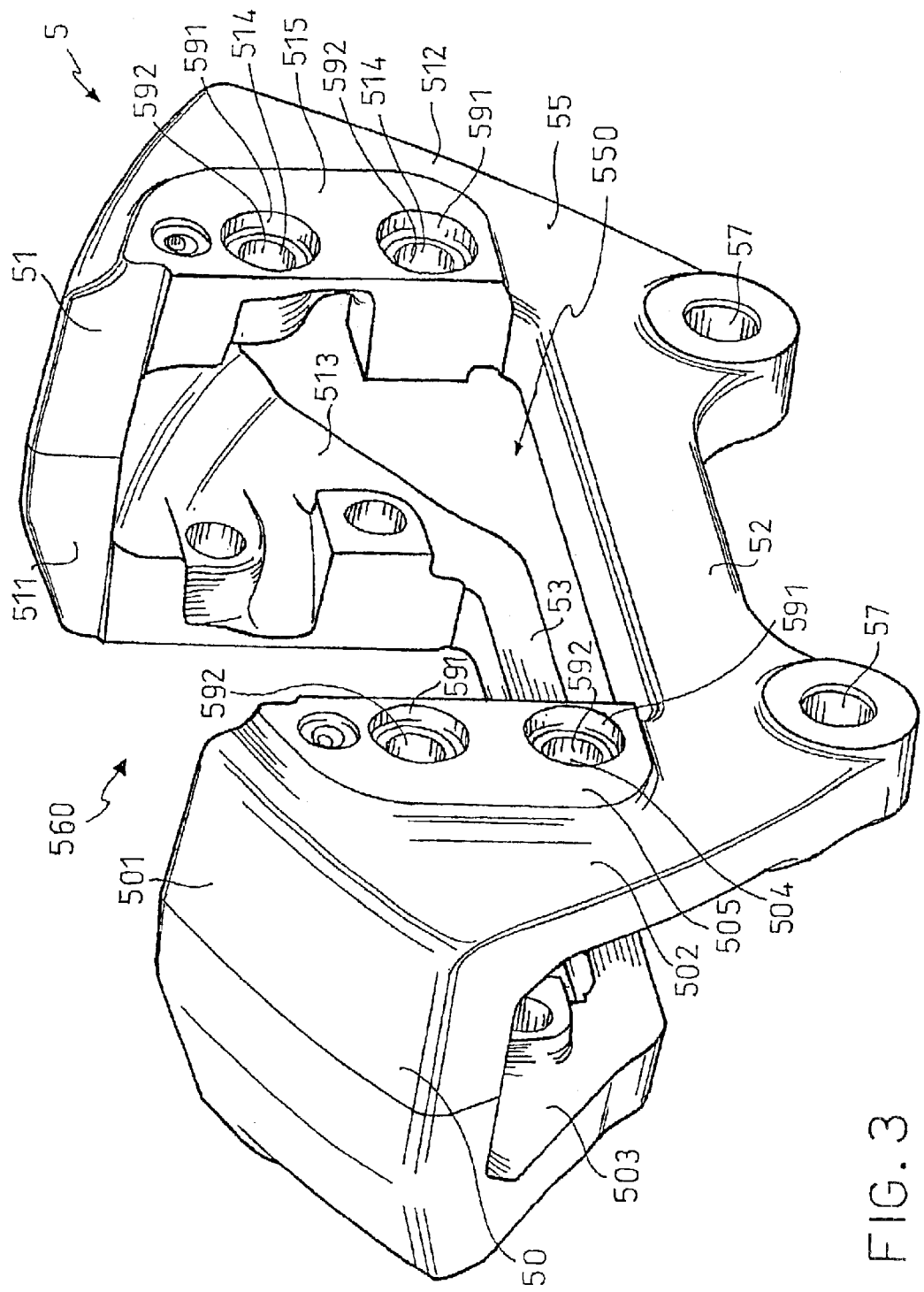
FIG. 3 is a perspective view of the detail of FIG. 2, from the inner side.

With reference to FIG. 3, this shows the connecting element 5, viewed from its inner side 55, that is, the side facing inwardly relative to a vehicle.

In particular, each of the first and second bridge elements 50 and 51 of the connecting element 5 is constituted by a respective arcuate portion 501 or 511, an inner arm 502 or 512 facing inwardly relative to a vehicle, and an outer arm 503 or 513 facing outwardly relative to a vehicle, respectively.

Advantageously, the first and second bridge elements 50, 51 are portions of a single component.

According to one embodiment, the inner arms 502 and 512 are joined in the vicinity of their free ends by an inner cross-member 52, and the above-mentioned outer arms 503 and 513 are joined by an outer cross-member 53 so that the connecting element 5 is constituted by a single component.

The arms and the cross-members define a window 550 facing the inner side of the disk, that is, an inner window, and a window 560 facing the outer side of the disk, that is, an outer window (FIG. 3) of the connecting element 5, these windows housing the pads 7 and allowing them to move within the connecting element when they are acted on by the pistons.

As shown in FIG. 3, on the surface 55 which does not face the disk, the inner arms 502 and 512 have respective protuberances or projecting portions 505 and 515, each having two holes 504 and 514, respectively.

In particular, each of the projecting portions 505 and 515 is complementary to one of the lateral seats 43 of the half-body 4. The holes 504 and 514 are aligned with respective through-holes 44 of the inner half-body 4 described above.

In the vicinity of their free ends, the inner arms 502 and 512 have protuberances which project towards the means for supporting the caliper body. These protuberances have holes 57 for housing screws for the fixing of the connecting element 5 to the caliper-support means provided on the vehicle.

Figure 2:
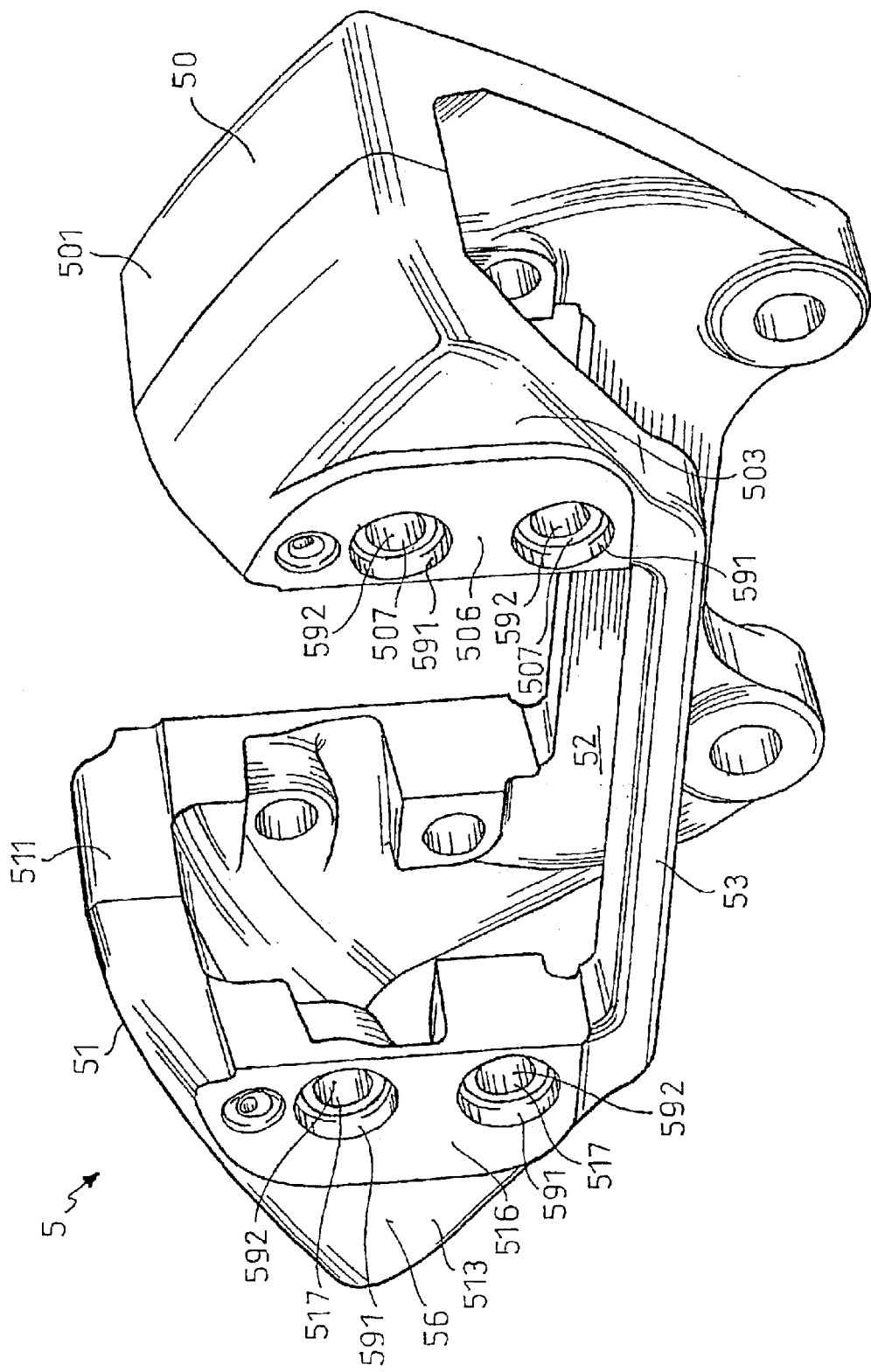
FIG. 2 is a perspective view of a detail of the fixed-caliper disk brake unit of FIG. 1 from the outer side.

FIG. 2 shows the connecting element 5, viewed from its outer face 56, that is, that facing outwardly relative to a vehicle.

On the side with the surface 56 which does not face the disk, as for the opposite surface 55, the outer arms 503 and 513 have respective protuberances or projecting portions 506 and 516 each having two holes 507 and 517, respectively.

In particular, each of the projecting portions 506 and 516 is such as to be complementary with one of the lateral seats 33 of the corresponding outer half-body 3.

According to one embodiment, both the holes 507 and 517 and the opposed holes 504 and 514 are through-holes and each has a first end portion 591 which faces the half-body and is enlarged so as to form a seat or half-shell-shaped seat for a calibrated bush 10 (FIG. 1). The remaining portion 592 of the hole has a smaller aperture and is, for example, threaded so as to engage the fixing screws 35, 45. Similarly, the through-holes 34, 44 in the half-bodies have first end portions 493 which face the arms of the connecting element and are enlarged so as to form respective seats or half-shell-shaped seats which are complementary with the seats of the corresponding arms and can house the portions of the calibrated bushes which project from the seats of the arms. Each of the calibrated bushes has a through-hole which allows the fixing screws, fitted in abutment in the holes of the half-bodies, to reach the threaded portions of the through-holes in the arms with their stems which project from the half-body.

According to one embodiment, the depth of the cross-member 53 facing the outer side of the disk is slightly less than that of the corresponding cross-member 52 facing the inner side of the disk.

By virtue of the inner and outer cross-members 52 and 53 formed integrally with the bridge elements 50 and 51, the connecting element 5 is particularly strong with respect to stresses generated by the clamping force and by the braking force, as well as unusually stiff.

As a result, the vibrations produced during braking are greatly reduced in amplitude and whistling is eliminated to an unusual extent.

The fixed-caliper disk brake unit 1 according to the present invention is particularly advantageous when fitted in high-performance motor cars in which the braking force may cause greater stresses on the bridge elements.

The assembly of the fixed-caliper disk brake unit 1 described above will now be described briefly.

First of all, the first half-body 3 is placed in contact with the connecting element 5 so that the surface 30 of the first half-body 3 which is to face the disk faces the surface 56 of the connecting element, the calibrated bushes having previously been housed in the respective seats in the arms.

In this position, the lateral seats 33 of the half-body 3 and the projecting portions 506 and 516 of the bridge elements 50 and 51, respectively, form a shaped coupling, since they are complementary, as described above.

Similarly, the surface 41 of the second half body 4 is placed against the inner face 55 of the connecting element 5 so as to form a shaped coupling between the lateral seats 44 of the second half-body and the projecting portions 505 and 515 of the bridge elements 50 and 51, respectively, of the connecting element 5, care being taken to interpose the calibrated bushes so that they are housed completely in the respective seats in the arms and in the half-body.

At this point, the screws 35 and 45 are inserted in the respective through-holes 34 and 44 of the respective first and second half-bodies 3 and 4 and are screwed into the threaded portions of the holes in the arms of the connecting element.

The first and second half-bodies 3 and 4 are thus fixed to the connecting element 5.

Clearly, this particular assembly stage is particularly simplified in comparison with the much more complex stages of the assembly of four-part calipers of the prior art. In fact, since the connecting element 5 proposed is formed as a single body, it ensures quicker location and manipulation of the individual components.

All of this considerably helps to reduce the likelihood of the occurrence of non-uniform stresses which are variable over time, and hence of vibrations, during braking.

The pads 7, fitted with the resilient means 8, are then inserted in the windows 550 and 560 of the connecting element 5.

Finally, each of the two guide pins 6 is inserted through through-holes 46 and 36 of the second half-body 4 and of the first half-body 3, respectively, and is engaged in the through-holes 74 of the pads 7 in order to support and guide the pads.

Clearly variants and/or additions may be provided for the embodiment described above.

In particular, the cross-members connecting the bridge elements may also be arranged in positions other than those described above.

Figure 4:
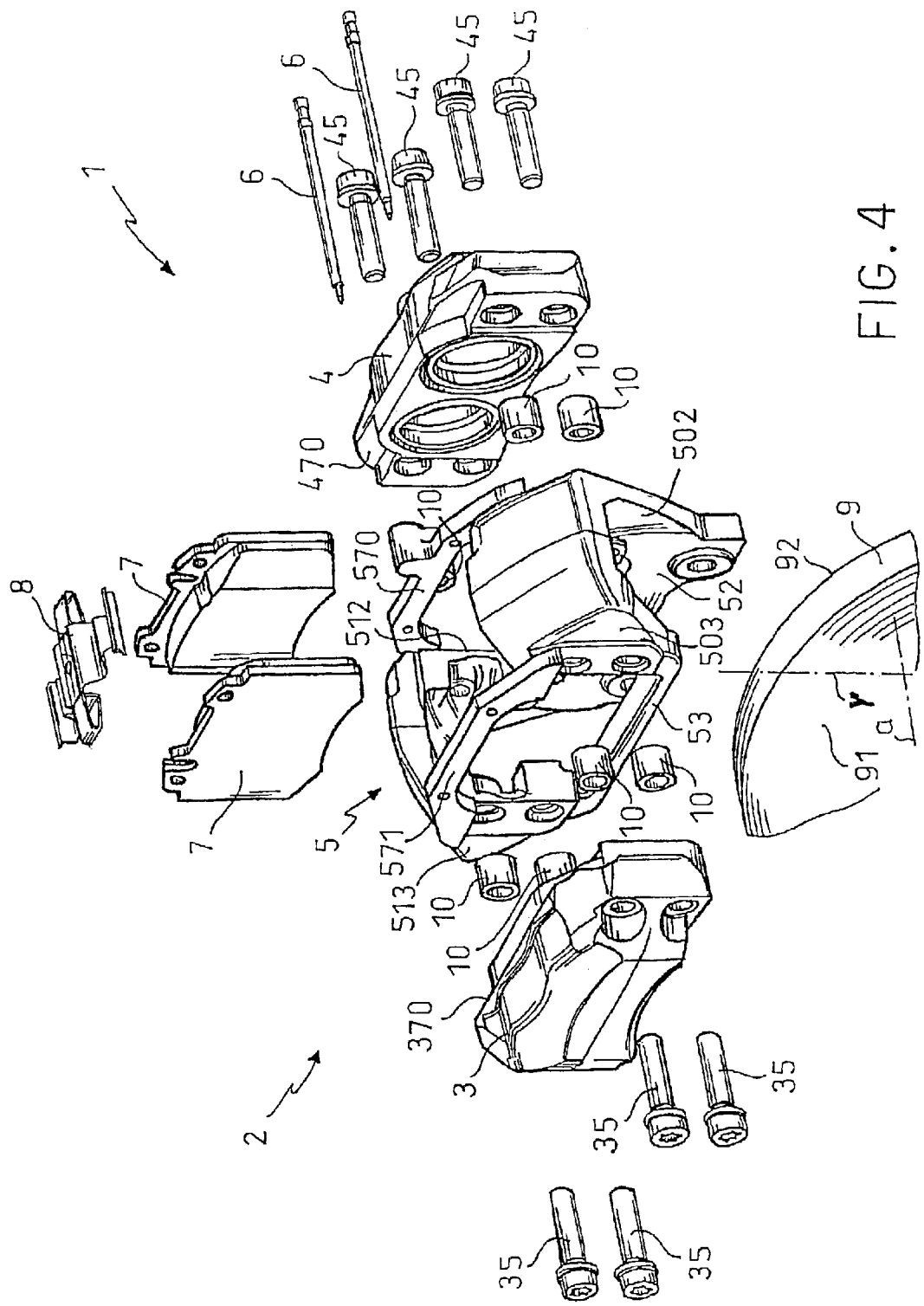
FIG. 4 is a perspective view of a fixed-caliper disk brake unit according to a second embodiment of the invention, with parts separated.
Figure 5:
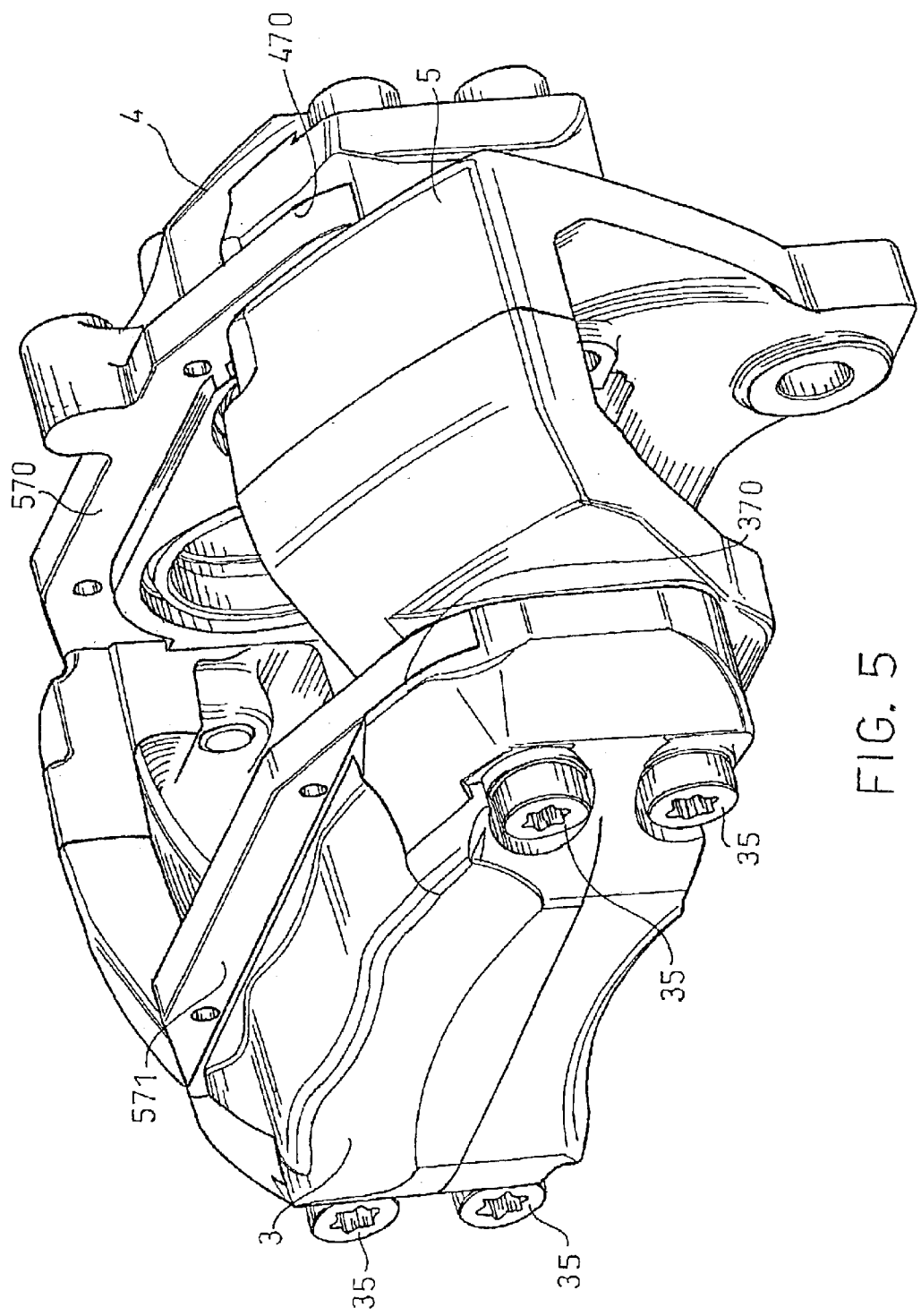
FIG. 5 is a perspective view of assembled elements of the disk brake unit of FIG. 4 from the outer side.

According to a second embodiment, further cross-members 570 and 571 extend from the portions of the arms 502, 512 and 503, 513 which are joined to the arcuate portions 501, 511, on both sides of the connecting element 5, for the further connection of the bridge elements 50, 51 and the reinforcement thereof (FIG. 4). When the half-bodies are coupled with the connecting element, these further cross-members 570, 571 are housed in seats 370, 470 in the half-bodies 3, 4 so as to be included within the overall dimensions of the half-bodies 3, 4. In other words, the further cross-members can be regarded as being constituted by a portion of material removed from the half-bodies and assigned to the connecting element 5 (FIG. 5). The cross-members 52, 53 and the further cross-members 570, 571 form, with the arms 502, 512, 503, 513 and the arcuate portions, a frame-like structure which is particularly resistant to bending stresses along both tangential and radial axes.

Figure 6:
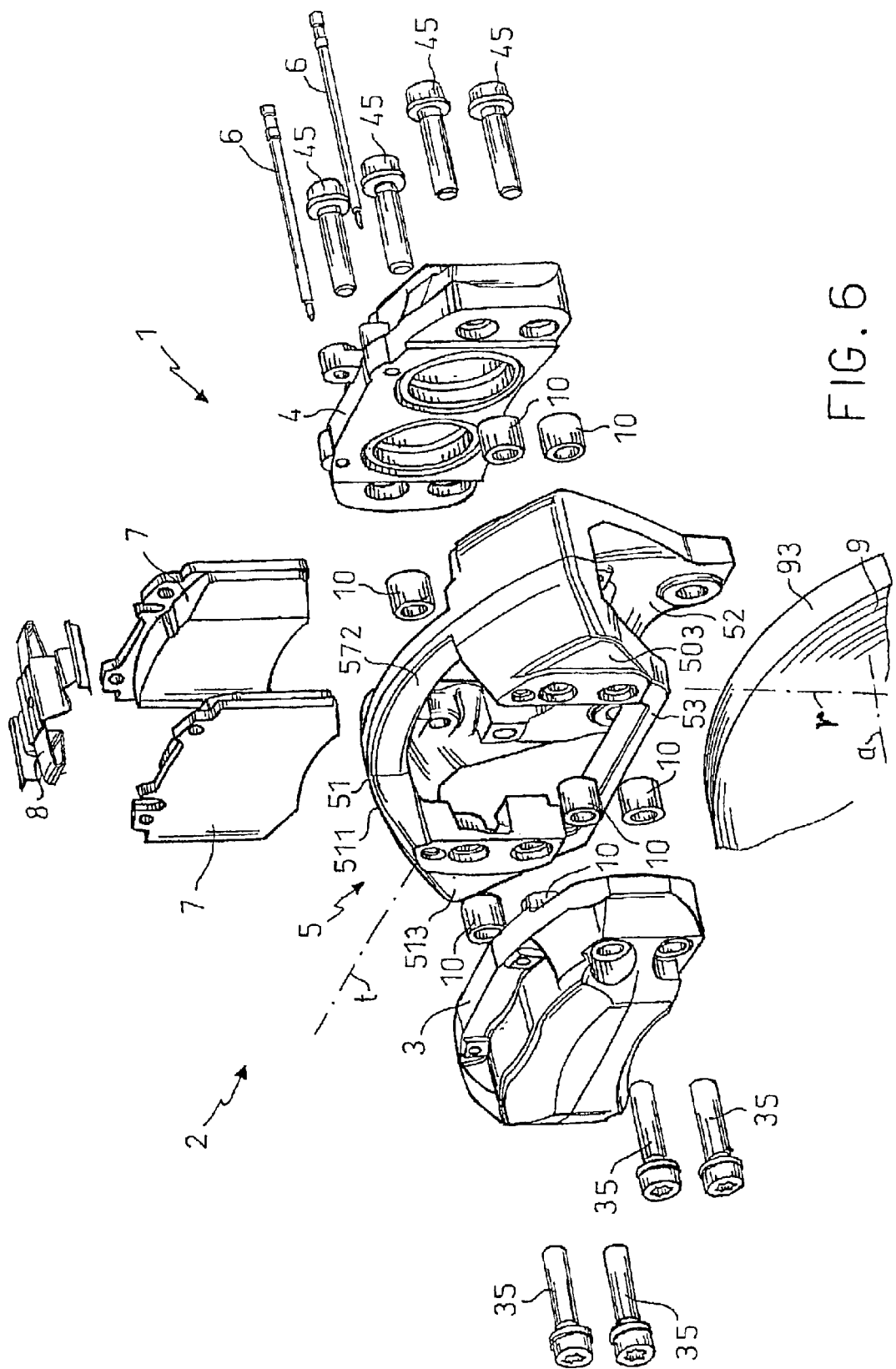
FIG. 6 is a perspective view of a fixed-caliper disk brake unit according to a third embodiment of the invention, with parts separated.
Figure 7:
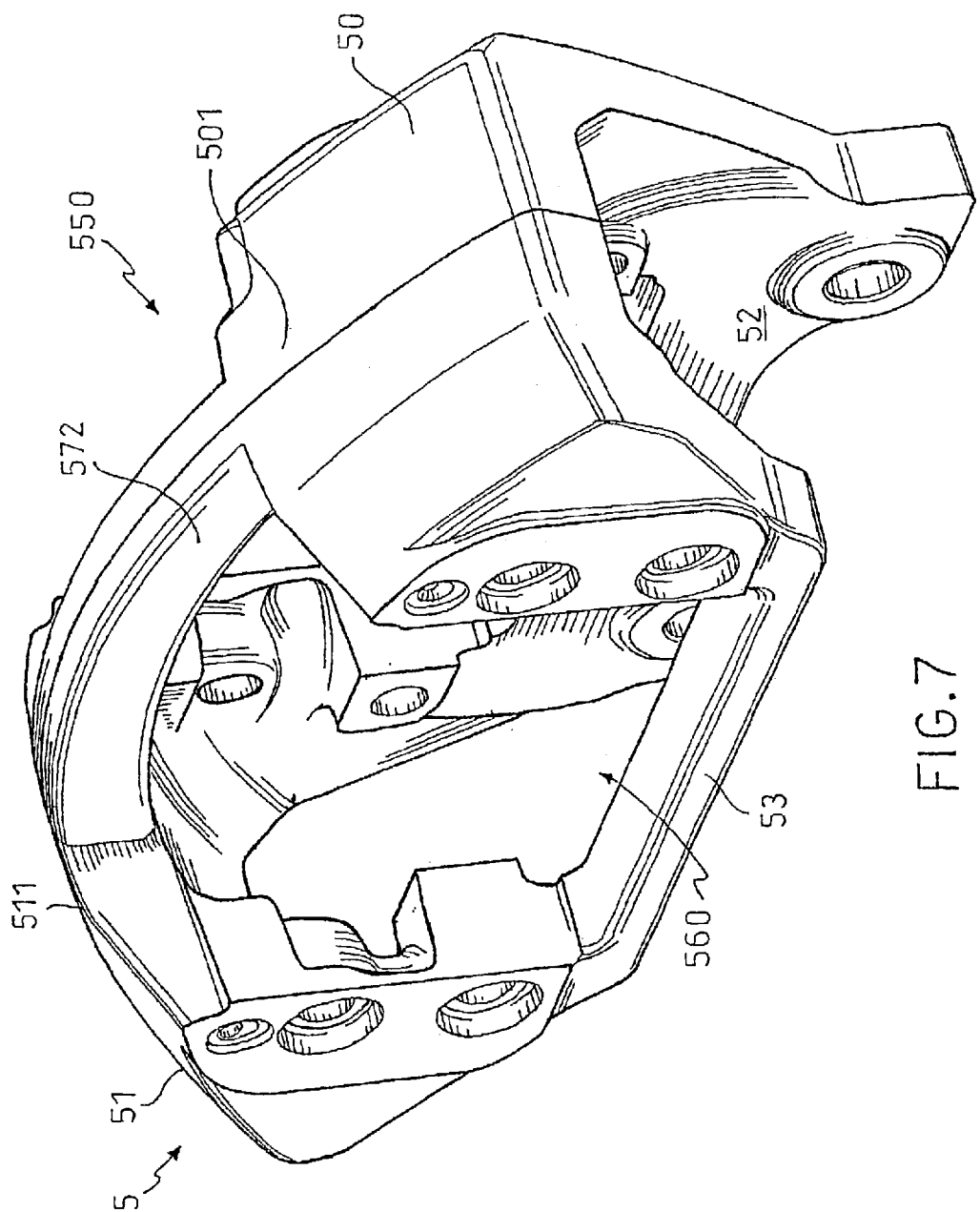
FIG. 7 is a perspective view of a detail of the disk brake unit of FIG. 6 from the outer side.

According to a third embodiment, the arcuate portions 501, 511 of the bridge elements 50, 51 are joined together by another further cross-member 572 (FIG. 6). For example, the other further cross-member 572 connects the central portion of a first arcuate portion 501 to the opposed central portion of a second arcuate portion 511, extending from the first arcuate portion 501 and joined to the second arcuate portion 511, as an extension of their profile of maximum dimensions. In other words, the other further cross-member is disposed centrally relative to the connecting element 5 as if to encircle the edge 93 of the disk 9 externally or, in other words, so as to constitute a handle for the manipulation of the connecting element (FIG. 7). Its central position affords free access to the windows 550, 560 which form the seats for the pads 7, for quick and easy replacement of the pads with the caliper mounted. The arrangement of the other further cross-member as an extension of the profiles of the arcuate portions also ensures unchanged radial dimensions. The other further cross-member 572, together with the cross-members 52, 53 in the vicinity of the ends of the arms, constitutes a set of three approximately equally spaced cross-members which afford a unitary connecting element 5 of unusual structural simplicity and strength with respect to the above-mentioned stresses.

In this last embodiment, the other further cross-member has a cross-section which is uniform or, alternatively, is variable along its length. For example, the other further cross member has a cross-section which decreases from the ends joined to the arcuate portions towards its centre.

The shape of the cross-members disposed in the vicinity of the free ends of the arms may also be modified in comparison with that shown in FIG. 2 or FIG. 3, so as to have slightly arcuate and more or less thickened portions.

The coupling and the fixing between the half-bodies and the connecting element may be formed differently, for example, with respective flat welded or glued contact or connecting surfaces.

The materials of which the above-mentioned components are made may comprise, for example, steel, cast iron, aluminium and alloys thereof, or composite material, for example, based on carbon or glass fibres or other similar material in a matrix of carbon or carbon and silicon.

As can be appreciated from the foregoing description, the fixed-caliper disk brake unit according to the invention solves the problem referred to in the introductory portion of the present description.

Naturally, in order to satisfy contingent and specific requirements, an expert in the art may apply to the above-described fixed-caliper disk brake unit many modifications and variations all of which, however, are included within the scope of the invention as defined by the following claims.

What is claimed is:

1. A fixed caliper body for a braking disk comprising:
a first half-body comprising a housing for a first generating means for generating a first braking force, said first half-body facing a first surface of said braking disk;

a second half-body comprising a housing for a second generating means for generating a second braking force, said second half-body facing a second surface of said braking disk on a side opposite from said first half-body; and a single element comprising:

an inner cross-member;

an outer cross-member; and bridge elements for connecting and supporting said first half-body and said second half-body, wherein said single element being suitable for receiving stresses generated by said first braking force, said second braking force, and a clamping force generated by said first and second generating means, and wherein said fixed caliper body is kept at a substantially constant distance from said braking disk.

2. The fixed caliper body according to claim 1, wherein each bridge element comprises:

an arcuate portion;

a first arm; and a second arm opposite the first arm, wherein said first arm and said second arm extend from an opposite end of said arcuate portion so that said first arm and said second arm face opposite sides of said braking disk.

3. The fixed caliper body according to claim 2, wherein said bridge elements are interconnected by said inner cross-member and said outer cross-member in the vicinity of free ends of said first arm and said second arm.

4. The fixed caliper body according to claim 3, wherein said first arm and said second arm each comprise a projecting portion.

5. The fixed caliper body according to claim 4, wherein said first half-body and said second half-body each comprise a seat that is coupled to said projecting portions.

6. The fixed caliper body according to claim 5, wherein said projecting portions comprise threaded holes for housing assembly screws.

7. The fixed caliper body according to claim 5, wherein each said half-body comprises a through-hole for housing said assembly screws used for fixing each said half-body to said single element.

8. The fixed caliper body according to claim 7, wherein said through-hole comprises enlarged portions that form facing seats for housing calibrated bushings.

9. The fixed caliper body according to claim 1, wherein said bridge elements are connected to each other by four cross-members.

10. The fixed caliper body according to claim 9, wherein said four cross-members interconnect ends of arms of said bridge elements that extend on a side of said braking disk.

11. The fixed caliper body according to claim 1, wherein said bridge elements are centrally interconnected by a cross-member.

12. A fixed-caliper disk brake unit comprising a fixed caliper body, wherein said caliper body comprises:

a first half-body comprising a housing for a first generating means for generating a braking force, said first half-body facing a first surface of a braking disk;

a second half-body comprising a housing for a second generating means for generating a braking force, said second half-body facing a second surface of said braking disk on a side opposite from said first half-body; and a single element comprising:

an inner cross-member;

an outer cross-member; and bridge elements for connecting and supporting said first half-body and said second half-body, wherein said single element being suitable for receiving stresses generated by said first braking force, said second braking force, and a clamping force generated by said first and second generating means, and wherein said fixed caliper body is kept at a substantially constant distance from said braking disk.

\* \* \* \* \*